United States Patent [19]

Naka et al.

[11] Patent Number: 5,645,624
[45] Date of Patent: Jul. 8, 1997

[54] GRANULAR FERTILIZER WITH A MULTILAYER COATING

[75] Inventors: Hiroshi Naka, Yokohama; Shunsuke Takase, Fuji, both of Japan

[73] Assignee: Asahi Kasei Kogyo Kabushiki Kaisha, Osaka, Japan

[21] Appl. No.: 347,449

[22] PCT Filed: Jul. 19, 1994

[86] PCT No.: PCT/JP94/01178

§ 371 Date: Nov. 29, 1994

§ 102(e) Date: Nov. 29, 1994

[87] PCT Pub. No.: WO95/03260

PCT Pub. Date: Feb. 2, 1995

[30] Foreign Application Priority Data

Jul. 21, 1993 [JP] Japan ................................. 5-180318

[51] Int. Cl.$^6$ ................... C05G 3/00; C05G 5/00
[52] U.S. Cl. ................ 71/64.07; 71/64.11; 71/64.13
[58] Field of Search .................. 71/64.07, 64.11, 71/64.13

[56] References Cited

U.S. PATENT DOCUMENTS

| | | | |
|---|---|---|---|
| 3,264,089 | 8/1966 | Hansen | 71/64.11 |
| 4,369,055 | 1/1983 | Fujita et al. | 71/64.11 |
| 5,176,734 | 1/1993 | Fujita et al. | 71/11 |
| 5,206,341 | 4/1993 | Ibay et al. | 528/361 |
| 5,300,135 | 4/1994 | Hudson et al. | 71/64.07 |

FOREIGN PATENT DOCUMENTS

| | | | |
|---|---|---|---|
| B-24399/92 | 3/1993 | Australia. | |
| 55-167197 | 12/1980 | Japan. | |
| 3-146492 | 6/1991 | Japan. | |
| 5-97561 | 4/1993 | Japan. | |
| 4304017 | 3/1993 | WIPO | 71/64.07 |

*Primary Examiner*—Ferris Lander
*Attorney, Agent, or Firm*—Pennie & Edmonds

[57] ABSTRACT

The present invention provides a granular fertilizer with a multilayer coating comprising a first layer containing at least one rapidly biodegradable polymer selected from the group consisting of a rapidly biodegradable aliphatic polyester and a rapidly biodegradable polyurethane compound, and a water-insoluble second layer containing at least one slowly biodegradable polymer selected from the group consisting of a slowly biodegradable cellulose derivative, low molecular weight polyethylene, low molecular weight wax and low molecular weight paraffin or light-degradable resins. The granular fertilizer with a multilayer coating of the present invention is characterized in that it is coated with coating materials having different dissolving-out rates, that dissolving-out of the fertilizer nutrients is controlled, and that the coating does not persist after the nutrients are dissolved out. Accordingly, the granular fertilizer coated with a multilayer of the present invention has less damaging effects on nature.

7 Claims, 1 Drawing Sheet

GRANULAR FERTILIZER WITH A MULTILAYER COATING

TECHNICAL FIELD

The present invention relates to a granular fertilizer with a multilayer coating for agriculture and gardening. The fertilizer is coated with coating materials having different degrading rates in a multilayer structure in order to control the dissolving-out rate and dissolving-out profile of the fertilizer nutrients. The coating materials do not remain in soil or water since they are degraded by microorganisms or light after all the nutrients are dissolved out.

BACKGROUND ART

It has been proposed to coat fertilizers with various polymers and inorganic materials. For example, Japanese Patent Publication Nos. 28927/1965 and 13681/1967 disclose various coating materials, but they have difficulties in controlling the dissolving-out rate of fertilizer nutrients.

U.S. Pat. No. 4,369,055 and Japanese Patent Application Laid-Open No. 167197/1980 have tried to facilitate degradation of coating materials while maintaining the function for controlling the dissolving-out rate by dispersing inorganic powders such as sulfur and talc in a low molecular olefin polymer. However, the disclosed coating materials are not completely degraded and they remain in soil.

Further, U.S. Pat. Nos. 5,176,734 and 5,206,341 and Japanese Patent Application Laid-Open No. 146492/1991 propose to coat a fertilizer with a biodegradable polymer. They only disclose to coat the fertilizer with a biodegradable coating material in a single layer. The single layer coating has a difficulty in controlling both the dissolving-out rate of fertilizer nutrients and the biodegradability at the same time.

Japanese Patent Application Laid-Open No. 97561/1993 discloses a three layer coating prepared by using one type of biodegradable film and a water-soluble resin. It also has a difficulty in controlling both the dissolving-out rate and the biodegradability at the same time. The application discloses that a thickness of the coating material is 500 to 2,000 μm. This invites high cost so that the coating material is not suitable for practical use.

The problem addressed by the present invention is to provide a granular fertilizer with a multilayer coating for agriculture and gardening, in which the dissolving-out rate and dissolving-out pattern of fertilizer nutrients are controllable and also the coating material does not remain in soil or water after the fertilizer nutrients are dissolved out.

DISCLOSURE OF THE INVENTION

The present inventors have made intensive and extensive studies to find that the above problem can be solved by coating a fertilizer with at least two types of coating materials having different dissolving-out rates and moisture permeability in a multilayer structure.

Namely, the present invention provides a granular fertilizer with a multilayer coating comprising a first layer containing at least one rapidly biodegradable polymer selected from the group consisting of a rapidly biodegradable aliphatic polyester and a rapidly biodegradable polyurethane compound, and a water-insoluble second layer containing at least one slowly biodegradable polymer selected from the group consisting of a slowly biodegradable cellulose derivative, low molecular weight polyethylene, low molecular weight wax and low molecular weight paraffin or light-degradable resins.

The first layer contains at least one rapidly biodegradable polymer selected from the group consisting of a rapidly biodegradable aliphatic polyester and a rapidly biodegradable polyurethane compound.

As criterion for biodegradability of plastics, colony growth rating of fungus is well known, which is disclosed in *Biodegradable Plastics*, Iwao Yamashita, CTI Processing Technology Researching Group, pp. 39–41 and *The Encyclopedia of Chemical Technology*, Supplemental Volume, 3rd Edition, J. E. Potts, John wiley & Sons, 1982, p. 626. The colony growth rating is measured according to ASTM G21-70 by taking the following steps.

Specimens are placed in or on a solid agar growth medium containing necessary components (excluding carbon) for the colony growth, and a suspension of fungus (e.g., *Aspergillus, Penicillium*, etc.) is sprayed over the surface of the medium to incubate at 28°–29° C. at a relative humidity of 85% or more for 21 days.

The grade of the colony growth rating is as follows:
IV: 60–100% of the specimen surface covered
III: 30–60% of the specimen surface covered
II: 10–30% of the specimen surface covered
I: 10% or less of the specimen surface covered
O: no growth visible In the present invention, rapid biodegradability corresponds to the colony growth rating IV.

Examples of the rapidly biodegradable aliphatic polyester include a poly-L-lactic acid, polycaprolactone, and aliphatic polyester represented by the following formula (1):

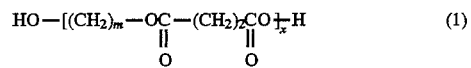

wherein m is 2 or 4; and x is 50 to 500.

Particularly, a poly-L-lactic acid having a weight-average molecular weight of 70,000 to 500,000, polycaprolactone having a weight-average molecular weight of 10,000 to 70,000 and aliphatic polyester represented by formula (1) having a weight-average molecular weight of 10,000 to 50,000 are preferred. A poly-L-lactic acid having a weight-average molecular weight of 150,000 to 250,000, polycaprolactone having a weight-average molecular weight of 50,000 to 70,000 and aliphatic polyester represented by formula (1) having a weight-average molecular weight of 30,000 to 50,000 are more preferred.

Examples of the rapidly biodegradable polyurethane compounds include polyurethane represented by the following formula (2):

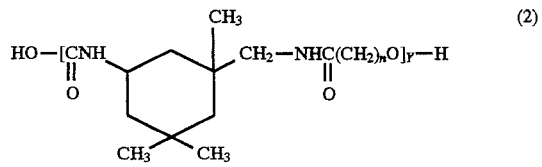

wherein n is 5 or 6; and Y is 70 to 1500.
Particularly, polyurethane represented by formula (2) having a weight-average molecular weight of 25,000 to 500,000 is preferred. Polyurethane represented by formula (2) having a weight-average molecular weight of 100,000 to 300,000 is more preferred.

The water-insoluble second layer contains slowly biodegradable polymers selected from the group consisting of a slowly biodegradable cellulose derivative, low molecular weight polyethylene, low molecular weight wax and low molecular weight paraffin or light-degradable resins.

Herein, the slowly biodegradability corresponds to the colony growth ratings I to III.

Examples of the slowly biodegradable cellulose derivative include nitrocellulose, ethyl cellulose and triacetyl cellulose. Particularly, nitrocellulose, ethyl cellulose and triacetyl cellulose which have a weight-average molecular weight of 10,000 to 300,000 are preferred. Nitrocellulose, ethyl cellulose and triacetyl cellulose which have a weight-average molecular weight of 100,000 to 300,000 are more preferred.

The low molecular weight polyethylene refers to polyethylene having a weight-average molecular weight of 500 to 10,000. A preferable weight-average molecular weight is 2,000 to 5,000.

The low molecular weight wax refers to wax having a weight-average molecular weight of 300 to 800. A preferable weight-average molecular weight is 400 to 800. Examples of such wax include animal natural wax such as beeswax, vegetable natural wax such as Japan wax, synthetic wax such as synthetic hydrocarbon and modified wax. Of these, synthetic wax of synthetic hydrocarbon is preferred.

The low molecular weight paraffin refers to paraffin having a weight-average molecular weight of 300 to 800. A preferable weight-average molecular weight is 400 to 800.

The light-degradable resins include polyolefin containing a light decomposer such as a transition metal complex, an oxidation accelerator and a light sensitizer, a copolymer of ethylene and carbon monoxide and a copolymer of vinyl and ketone. The weight-average molecular weight of the compounds is preferably 5,000 to 50,000, more preferably 10,000 to 30,000. Of the polyolefins, polyethylene is preferable.

Examples of the copolymer of vinyl and ketone include a copolymer of ethylene and methylvinyl ketone and a copolymer of ethylene and ethylvinyl ketone.

The transition metal complex includes iron acetyl acetonate. It is preferably added in an amount of 0.005 to 0.2% by weight based on the amount of the polyolefin.

The preferable slowly biodegradable polymer has moisture permeability of 2.5 g/m$^2$/day or more which is measured according to JIS Z 0208.

The rapidly biodegradable polymer and the slowly biodegradable polymer must be coated in a multilayer structure.

When the rapidly biodegradable aliphatic polyester or polyurethane compound is coated in a single layer, the desired dissolving-out rate of the fertilizer can be achieved at an early stage due to its low moisture permeability, but the dissolving-out rate cannot be controlled later since the coating is degraded by microorganisms to make holes in the layer at the early stage.

When the water-insoluble slowly biodegradable cellulose derivative is coated in a single layer, the desired dissolving-out rate of the fertilizer cannot be achieved due to high moisture permeability. When the low molecular weight polyethylene, the low molecular weight wax, the low molecular paraffin or the light-degradable resin is coated in a single layer, the desired dissolving-out rate can be achieved due to their low moisture permeability. However, if the coating is thick, the dissolving-out rate cannot often be controlled because of cracks.

When the rapidly biodegradable polymer is used together with the slowly biodegradable polymer, both of them can be mixed to form a single layer coating. However, if polymers having different properties are mixed, fine voids appear at the boundary between polymers. The fine voids cannot be uniformly formed all over the layer so that the dissolving-out rate cannot be controlled due to the intimate relation between the moisture permeability of the coating and the voids.

Preferable combinations of the first and second coatings are a combination of a first coating containing a poly-L-lactic acid and a second coating containing low molecular weight wax, a combination of a first coating containing an aliphatic polyester compound represented by formula (1) wherein m is 4 and x is 200 to 250 and a second coating containing low molecular weight wax, and a combination of a first coating containing a poly-L-lactic acid and a second coating containing ethyl cellulose.

In the present invention, the coating may comprise three layers or more. For example, a fertilizer may be coated with a poly-L-lactic acid, polycaprolactone and low molecular weight wax in turn to form three layers.

The type of the coating material, the coating percentage and the coating thickness is selected according to the desired time for starting dissolving out, the particle size of fertilizer and the dissolving-out rate and profile. The weight percentage of the whole coating materials relative to the granular fertilizer, i.e., the coating percentage of the whole coating material, is preferably 2 to 40% by weight, more preferably 2 to 20% by weight in view of the dissolving-out rate. The coating percentage of the first coating is preferably 1.5 to 32% by weight and that of the second coating is preferably 0.5 to 8% by weight. The thicknesses of the first and second coatings are preferably 15 to 235 μm and 15 to 50 μm, respectively. The thickness of the whole coating is preferably 30 to 300 μm, more preferably 30 to 250 μm.

If necessary, a surfactant, talc, calcium carbonate, a metallic oxide and the like can be added to the coating material.

The fertilizers to be used in the present invention are not particularly limited. The known chemical fertilizers such as ammonium sulfate, ammonium nitrate, urea, sodium nitrate, ammonium phosphate, and potassium phosphate may be used individually or in combination.

The process for preparing the multilayer granular fertilizer of the present invention is not particularly limited. Suitable processes include a process wherein a rolling or floating granular fertilizer is coated by spraying a solution in which a coating material is dissolved or dispersed; a process wherein a granular fertilizer is immersed in a solution containing the above coating material and then the solvent is removed; and the like. The present invention preferably employs a coating process wherein a solution prepared by dissolving or dispersing the coating material in chlorinated hydrocarbons, an organic solvent such as ketone and water is sprayed to a granular fertilizer while immediately drying the fertilizer with high stream of hot air.

Further, the coating material must be dispersed uniformly. If the dispersal is not uniform, the dissolving-out rate of the fertilizer components is unstable.

BEST MODE FOR CARRYING OUT THE INVENTION

Figure 1:
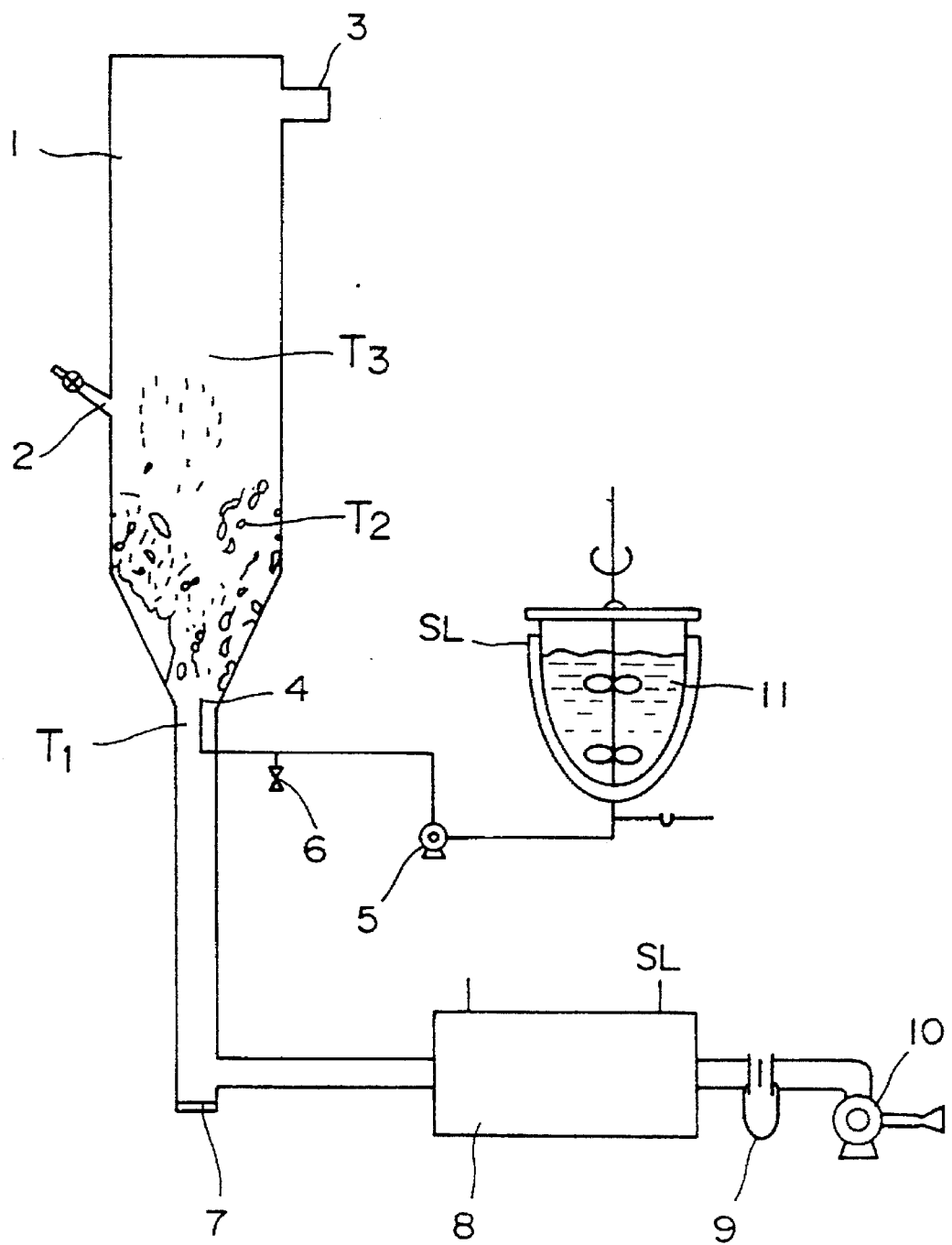
FIGURE 1 shows an apparatus for preparing a granular fertilizer with a multilayer coating of the present invention.

Now, the present invention is illustrated in more detail referring to Examples and Comparative Examples.

The apparatus and preparation process are as follows.

FIGURE 1 is an example of apparatus suitable for preparing the granular fertilizer with a multilayer coating in accordance with the present invention. Referring to the FIGURE, numeral 1 indicates a spouting column having a column diameter of 200 mm, height of 180 mm and an air-spouting diameter of 42 mm. Numerals 2 and 3 indicate a fertilizer-feeding port and an exhaust gas-discharging port, respectively. $T_1$, $T_2$ and $T_3$ indicate thermometers and SL refers to steam.

A jet of air is sent from a blower 10 via an orifice flowmeter 9 and heat-exchanger 8 to the spouting column 1. The flow rate and the air temperature are controlled by the flowmeter 9 and the heat-exchanger 8, respectively, and the exhaust gas is discharged through a discharging port 3. The granular fertilizer to be subjected to the coating treatment is fed through a fertilizer-feeding port 2 with a certain amount of hot air to form the spout. The coating treatment is conducted by blowing a solution containing the coating material through the fluid-nozzle 4 toward the spout in spray form when the temperature of the fertilizer granules reaches an effective level for coating.

The coating liquid is prepared by feeding certain amounts of the coating material and the solvent into a tank 11 with stirring, at about the boiling point of the solvent. The coating liquid is fed to the nozzle 4 by a pump 5. This system should be well-warmed in advance to maintain the temperature. After a suitable amount of the coating liquid has been fed, the pump 5 and blower 10 are stopped. The resultant coated fertilizer is taken out from a discharge port 7. Both the first layer and the second layer can be formed basically according to the above-described process. A valve is indicated by numeral 6. In the following Examples and Comparative Examples, the coating of the granular fertilizer is conducted with some basic conditions, indicated below. The coating percentage is changed by changing the amounts of the fertilizer fed and the coating liquid supplied. The amounts of the fertilizer fed and the coating liquid supplied are changed by changing some of the following conditions.

Basic Conditions:

Fluid-nozzle: opening 0.8 mm, full cone type

Amount of hot air: 4 m³/min.

Temperature of hot air: 80° C.

Type of the fertilizer: potassium nitro-phosphate of 5 to 9 mesh particle size

Amount of the fertilizer at its feeding port: 5 kg

Concentration of the coating solution: solids content 3 wt. %

Rate of the coating solution fed: 0.5 kg/min.

Coating time: 30 minutes

Coating percentage (relative to fertilizer): 8.0 wt. %

Solvent: trichroloethylene

EXAMPLES 1 TO 15 AND COMPARATIVE EXAMPLES 1 TO 9

According to the above-mentioned process, samples of coated potassium nitro-phosphate with coating materials and the coating percentage as shown in Tables 1 and 2 were prepared. In Comparative Examples 7 to 9, two coating materials were mixed to coat in a single layer.

The weight-average molecular weight was measured with gel permeation chromatography.

Abbreviations in Table 1 are as follows:

PCL: polycaprolactone having a weight-average molecular weight of about 45,000

PLL: poly-L-lactic acid having a weight-average molecular weight of about 200,000

APE: aliphatic polyester having a weight-average molecular weight of about 40,000 represented by formula (1) wherein m is 4 and x is about 230

PUT: polyurethane having a weight-average molecular weight of about 280,000 represented by formula (2) wherein n is 6 and Y is about 830

EC: ethyl cellulose having a weight-average molecular weight of about 100,000

TA: triacetyl cellulose having a weight-average molecular weight of about 150,000

WX: low molecular weight polyethylene wax having a weight-average molecular weight of about 500

PE: low molecular weight polyethylene having a weight-average molecular weight of about 3,000

Ra: polyethylene having a weight-average molecular weight of about 20,000 containing 0.1% of light-decomposer a (iron acetyl acetonate) based on the resin Rb: light-degradable resin b (a copolymer of ethylene and carbon monoxide having a weight-average molecular weight of about 10,000)

Rc: light-degradable resin c (a copolymer of ethyl and ethylvinyl ketone having a weight-average molecular weight of about 10,000)

In Examples 1 to 15 and Comparative Examples 1 to 8, the amount of nitrogen dissolved out in water at 25° C. was analyzed using an analytical instrument. The results are shown in Table 1.

In Examples 1, 2, 6 to 8 and 10 to 14 and Comparative Examples 1 to 7 and 9, the amount of nitrogen dissolved out in soil at 25° C. was measured. The results are shown in Table 2.

In Examples 1, 7, 8, 10 and 12 and Comparative Examples 1 to 4, the state of the coating after 140 days was visually observed and the residual coating is pressed with fingers for a breaking test. Then, the surface of the coating was washed with water and observed using a microscope to examine the corrosion by microorganisms. The results are shown in Table 3.

As seen from Table 1, the nitrogen dissolving-out rate can be controlled by selecting the type of the coating material and coating percentage of the first and second coatings in the Examples. In Comparative Examples 4 and 5, the nitrogen dissolving-out rate is too fast. In Comparative Example 6, the nitrogen dissolving-out rate is too slow. Comparing Examples 7 and 15 with Comparative Examples 7 and 8, it is seen that, when coating percentages of the coating materials for the first and second coatings are changed while keeping the coating percentage of the whole coating materials same, the nitrogen dissolving-out rate can be changed according to desire in case of a fertilizer coated with multiple layers; to the contrary, it cannot be changed in case of a fertilizer coated with a single layer.

It is seen from the comparison of Tables 1 and 2 that the nitrogen dissolving-out rate in soil is almost the same as that in water since decomposition by the microorganisms in soil does not affect the coated fertilizer in the Examples; on the other hand, the nitrogen dissolving-out rate in soil is faster than that in water due to the decomposition by the microorganisms in Comparative Examples 1 to 3. In Comparative Example 6 on Table 2, the nitrogen dissolving-out percentage was suddenly increased on the 60th day. This indicates the coating cracked.

Table 3 shows that the coatings in the Examples had not been degraded for 140 days. Comparative Examples 1 to 4 show that the coatings were biodegraded.

INDUSTRIAL APPLICABILITY

The granular fertilizer with a multilayer coating of the present invention is characterized in that it is coated with coating materials having different dissolving-out rates, that dissolving-out of the fertilizer nutrients is controlled, and that the coating does not persist after the nutrients are dissolved out. Accordingly, the granular fertilizer with a multilayer coating of the present invention is less damaging to the environment.

TABLE 1

Nitrogen dissolving-out percentage in water (25° C.)

| Ex. & Comp. Ex. | Coating material for first coating (coating percentage) | Coating material for second coating (coating percentage) | Nitrogen dissolving-out percentage (%) | | | | |
|---|---|---|---|---|---|---|---|
| | | | 30 days | 60 days | 100 days | 140 days | 180 days |
| Ex. 1 | PCL (5%) | EC (3%) | 32.6 | 51.5 | 70.4 | 82.6 | 84.0 |
| Ex. 2 | PLL (5%) | EC (3%) | 53.5 | 73.0 | 85.6 | 88.0 | 89.0 |
| Ex. 3 | APE (5%) | EC (3%) | 32.0 | 45.8 | 58.2 | 69.0 | 75.7 |
| Ex. 4 | PUT (5%) | EC (3%) | 46.0 | 65.0 | 79.0 | 84.9 | 87.1 |
| Ex. 5 | PCL (6%) | TA (2%) | 39.5 | 58.2 | 73.4 | 83.8 | 84.0 |
| Ex. 6 | PLL (6%) | TA (2%) | 58.6 | 77.0 | 85.9 | 87.1 | 89.2 |
| Ex. 7 | PLL (5%) | WX (3%) | 39.3 | 59.0 | 84.3 | 91.3 | 91.3 |
| Ex. 8 | APE (5%) | WX (3%) | 15.8 | 27.3 | 46.0 | 61.1 | 71.6 |
| Ex. 9 | PCL (5%) | PE-Ra (1%) | 18.6 | 38.4 | 60.3 | 72.8 | 78.9 |
| Ex. 10 | PLL (5%) | PE-Ra (1%) | 26.7 | 51.0 | 70.5 | 79.4 | 85.8 |
| Ex. 11 | APE (5%) | PE-Ra (1%) | 14.8 | 31.2 | 47.5 | 57.5 | 68.0 |
| Ex. 12 | PUT (5%) | PE-Ra (1%) | 28.9 | 51.1 | 66.2 | 77.0 | 85.8 |
| Ex. 13 | PLL (5%) | Rb (1%) | 25.4 | 52.8 | 73.6 | 81.1 | 88.2 |
| Ex. 14 | PLL (5%) | Rc (1%) | 25.1 | 52.0 | 71.8 | 80.4 | 86.0 |
| Ex. 15 | PLL (3%) | WX (5%) | 15.0 | 26.2 | 42.6 | 55.3 | 64.9 |
| Comp. Ex. 1 | PCL (8%) | — | 28.5 | 47.3 | 66.1 | 80.0 | 84.1 |
| Comp. Ex. 2 | PLL (8%) | — | 50.5 | 70.3 | 83.0 | 88.5 | 90.8 |
| Comp. Ex. 3 | APE (8%) | — | 25.3 | 40.2 | 54.3 | 66.8 | 77.2 |
| Comp. Ex. 4 | — | EC (8%) | 78.6 | 85.3 | 87.0 | 89.4 | 91.0 |
| Comp. Ex. 5 | — | TA (8%) | 83.7 | 89.5 | 90.4 | 91.1 | 91.2 |
| Comp. Ex. 6 | — | WX (8%) | 7.4 | 18.3 | 43.5 | 64.7 | 73.5 |
| Comp. Ex. 7 | Mixture of PLL (5%) & WX (3%) | | 69.0 | 81.2 | 89.4 | 90.1 | 93.2 |
| Comp. Ex. 8 | Mixture of PLL (3%) & WX (5%) | | 62.4 | 75.6 | 79.2 | 90.3 | 91.1 |

TABLE 2

Nitrogen dissolving-out percentage in soil (%)

| Ex. & Comp. Ex. | Coating material for first coating (coating percentage) | Coating material for second coating (coating percentage) | Nitrogen dissolving-out percentage (%) | | | | |
|---|---|---|---|---|---|---|---|
| | | | 30 days | 60 days | 100 days | 140 days | 180 days |
| Ex. 1 | PCL (5%) | EC (3%) | 27.3 | 46.1 | 60.6 | 72.0 | 79.8 |
| Ex. 2 | PLL (5%) | EC (3%) | 41.2 | 61.2 | 74.5 | 81.7 | 84.7 |
| Ex. 6 | PLL (6%) | TA (2%) | 46.6 | 67.0 | 81.3 | 86.4 | 89.6 |
| Ex. 7 | PLL (5%) | WX (3%) | 11.1 | 28.3 | 72.2 | 80.6 | 83.5 |
| Ex. 8 | APE (5%) | WX (3%) | 13.7 | 20.1 | 35.6 | 56.4 | 68.3 |
| Ex. 10 | PLL (5%) | PE-Ra (1%) | 22.4 | 43.6 | 60.0 | 71.4 | 78.7 |
| Ex. 11 | APE (5%) | PE-Ra (1%) | 12.6 | 26.9 | 41.7 | 49.5 | 61.9 |
| Ex. 12 | PUT (5%) | PE-Ra (1%) | 25.0 | 44.3 | 57.6 | 66.3 | 74.6 |
| Ex. 13 | PLL (5%) | Rb (1%) | 22.1 | 45.3 | 64.0 | 71.5 | 76.7 |
| Ex. 14 | PLL (5%) | Rc (1%) | 21.6 | 44.6 | 66.1 | 72.8 | 77.8 |
| Comp. Ex. 1 | PCL (8%) | — | 93.4 | 100 | 100 | 100 | 100 |
| Comp. Ex. 2 | PLL (8%) | — | 52.7 | 95.8 | 100 | 100 | 100 |
| Comp. Ex. 3 | APE (8%) | — | 76.5 | 98.7 | 100 | 100 | 100 |
| Comp. Ex. 4 | — | EC (8%) | 74.5 | 79.3 | 83.6 | 84.0 | 84.4 |
| Comp. Ex. 5 | — | TA (8%) | 79.2 | 82.1 | 86.6 | 89.8 | 90.5 |
| Comp. Ex. 6 | — | WX (8%) | 21.0 | 82.8 | 83.1 | 87.0 | 92.5 |
| Comp. Ex. 7 | Mixture of PLL (5%) & WX (3%) | | 55.0 | 85.8 | 94.1 | 94.9 | 95.2 |
| Comp. Ex. 9 | Mixture of PCL (5%) & EC (3%) | | 80.2 | 100 | 100 | 100 | 100 |

TABLE 3

Observation of coating after embedded in soil

| Ex. & Comp. Ex. | Coating material for first coating (coating percentage) | Coating material for second coating (coating percentage) | Visual observation and press test with fingers | Observation with microscope |
|---|---|---|---|---|
| Ex. 1 | PCL (5%) | EC (3%) | 1) | 8) |
| Ex. 7 | PLL (5%) | WX (3%) | 2) | 9) |
| Ex. 8 | APE (5%) | WX (3%) | 3) | 9) |
| Ex. 10 | PLL (5%) | PE-Ra (1%) | 1) | 8) |
| Ex. 12 | PUT (5%) | PE-Ra (1%) | 1) | 8) |
| Comp. Ex. 1 | PCL (8%) | — | 4) | 10) |
| Comp. Ex. 2 | PLL (8%) | — | 5) | 11) |
| Comp. Ex. 3 | APE (8%) | — | 4) | 10) |
| Comp. | — | EC (8%) | 7) | 9) |

1) No change observed in appearance since embedded. No change on pressing.
2) Cloudy coating material observed. Cracked on pressing.
3) No change observed in appearance since embedded. Cracked on pressing.
4) Not in a granular shape so impossible to conduct a press test.
5) Cloudy coating material observed. Broken by pressing.
6) No change observed in appearance since embedded. Broken by pressing.
7) Cloudy coating material observed. No change on pressing.
8) No tracks of hyphae observed.
9) A few tracks of hyphae observed.
10) Fungi adhering to the coating and many tracks of hyphae observed.
11) Tracks of hyphae observed.

We claim:

1. A granular fertilizer with a multilayer coating comprising a first layer as an inner layer containing at least one rapidly biodegradable polymer selected from the group consisting of poly-L-lactic acid having a weight-average molecular weight of 70,000 to 500,000, polycaprolactone having a weight-average molecular weight of 10,000 to 70,000, aliphatic polyester having a weight-average molecular weight of 10,000 to 50,000 represented by the following formula (1):

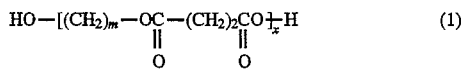

wherein m is 2 or 4, and x is 50 to 500;
and polyurethane having a weight-average molecular weight of 25,000 to 500,000 represented by the following formula (2):

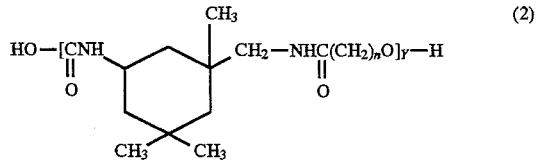

wherein n is 5 or 6 and Y is 70 to 1500;
and a water-insoluble second layer as an outer layer containing at least one slowly biodegradable polymer selected from the group consisting of at least one cellulose derivative having a weight-average molecular weight of 10,000 to 300,000 selected from the group consisting of of nitrocellulose, ethyl cellulose and triacetyl cellulose, low molecular weight polyethylene having a weight-average molecular weight of 500 to 10,000, low molecular weight wax having a weight-average molecular weight of 300 to 800, and a low molecular weight paraffin having a weight-average molecular weight of 300 to 800 or light degradable resin;
wherein the first layer is in an amount sufficient to control the dissolving-out rate of the fertilizer nutrients, and the second layer is in an amount sufficient to control the biodegradability of the first layer.

2. A granular fertilizer according to claim 1, wherein the light-degradable resin is a polyolefin resin containing a light-decomposer, a copolymer of ethylene and carbon monoxide and a copolymer of vinyl and ketone.

3. A granular fertilizer according to claim 1, wherein the first layer and the water-insoluble second layer contain poly-L-lactic acid and low molecular weight wax, respectively.

4. A granular fertilizer according to claim 1, wherein the first layer and the water-insoluble second layer contain an aliphatic polyester represented by the formula (1) in which m is 4 and x is 200 to 250 and low molecular weight wax, respectively.

5. A granular fertilizer according to claim 1, wherein the first layer and the water-insoluble second layer contain poly-L-lactic acid and ethyl cellulose, respectively.

6. A granular fertilizer according to claim 1, wherein the water-insoluble second layer has moisture permeability of more than 2.5 g/m$^2$/day and a coating thickness of 15 to 50 µm.

7. A granular fertilizer according to claim 1, wherein the first layer and the water-insoluble second layer have coating percentages of 1.5 to 32% by weight and 0.5 to 8% by weight, respectively, and the coating percentage of the whole coating material is 2 to 40% by weight.

* * * * *